United States Patent [19]
Barkhuff et al.

[11] B 3,994,017
[45] Nov. 23, 1976

[54] RANDOM ACCESS DISK FILE WITH AXIAL TRANSLATION OF DISKS AND END PLATE

[75] Inventors: Earl D. Barkhuff, Staatsburg; David S. Borm, Red Hook; Bernard W. McGinnis, Poughkeepsie; Bertel E. Rosenlund, Hopewell Junction, all of N.Y.

[73] Assignee: International Business Machines Corporation, Armonk, N.Y.

[22] Filed: July 1, 1974

[21] Appl. No.: 484,482

[44] Published under the second Trial Voluntary Protest Program on March 23, 1976 as document No. B 484,482.

[52] U.S. Cl. .................................. 360/98; 360/86; 360/99; 360/133
[51] Int. Cl.² .................. G11B 5/012; G11B 23/02; G11B 5/82
[58] Field of Search .................. 360/98, 99, 71, 77, 360/86, 97, 102, 103, 133, 135

[56] References Cited
UNITED STATES PATENTS

| | | | |
|---|---|---|---|
| 3,130,393 | 4/1964 | Gutterman | 360/98 |
| 3,509,553 | 4/1970 | Krijnen | 360/98 |
| 3,618,055 | 11/1971 | Acker et al. | 360/98 |

*Primary Examiner*—Alfred H. Eddleman
*Attorney, Agent, or Firm*—Robert Lieber

[57] ABSTRACT

In a random access storage device a head transported relative to a rotating assembly of flexible disks and a pair of co-rotating end plates operates in clearance spaces formed by sliding the disks apart at a selected interface. One of the end plates is attached to a low friction spline which is quickly shiftable between predetermined axial limit positions. In the most confining position of this plate a single selected interface space between the disks is partially opened by deflection of the disks. The partial opening is sufficient to establish a pressure difference relative to the other interfaces but not enough for unobstructed entrance of the head. Shortly after formation of the partial opening the shiftable plate is actuated away from the disks in a quick movement. Due to the suction effects accompanying this movement, and the just-mentioned pressure difference, the disks between the partial opening and the shifting plate are cohesively moved away from the selected interface as a sliding unit; thereby expanding that interface sufficiently to accommodate the head.

28 Claims, 7 Drawing Figures

RANDOM ACCESS DISK FILE WITH AXIAL TRANSLATION OF DISKS AND END PLATE

CROSS REFERENCES TO RELATED PATENT APPLICATIONS

1. U.S. Pat. application, Ser. No. 414,614, by R. J. Penfold et al, filed Nov. 7, 1973, entitled "Multiple Flexible Disk File", now U.S. Pat. No. 3,867,723, issued Feb. 18, 1975 assigned to the same assignee as the present application.

2. U.S. Pat. No. 3,810,243, issued May 7, 1974 by B. W. McGinnis et al, entitled "Selectively Tensioned Transducer Assembly For Operation In Compliant Relation To Individual Memory Discs Of A Partitionable Aggregate of Rotating Flexible Discs", assigned to the same assignee as the present application.

3. U.S. Pat. application, Ser. No. 375,988, by R. A. Barbeau et al, filed July 2, 1973, entitled "Stabilization of Partitionable Memory With Flexible Rotating Discs", assigned to the same assignee as the present application now U.S. Pat. 3,852,820 granted Dec. 3, 1974.

4. U.S. Pat. application, Ser. No. 375,989, by R. A. Barbeau et al, filed July 2, 1973, entitled "Partitionable Disc Memory With Flexible Discs and Conformally Suspended Head", assigned to the same assignee as the present application now U.S. Pat. 3,838,462 granted Sept. 24, 1974.

5. U.S. Pat. application, Ser. No. 484,830 (IBM Docket No. PO-9-74-001) by B. W. McGinnis et al, filed July 1, 1974 entitled "Bistable Deflection Separation of Flexible Disks".

FIELD OF THE INVENTION

The invention relates to random access multi-disk storage devices in which continuously rotating storage disks arranged coaxially in an interfacing configuration are separated at selected interfaces to provide successive spaces for operation of a movable head.

DESCRIPTION OF THE PRIOR ART

Prior art multi-disk storage devices, in which otherwise inaccessible interfacing disk recording surfaces are displaced while rotating in order to establish clearance space for operation of a movable head, include sliding and flexing arrangements. In sliding arrangements represented by apparatus of the type disclosed in U.S. Pat. No. 3,130,393 (Gutterman), expansion of a selected interface between slidably mounted self-supporting disks is accomplished by applying air under high pressure to that interface; the air forcing the disks to slide apart.

Another sliding arrangement disclosed in U.S. Pat. No. 2,960,340 (Seidel) allows phonograph records to separate by sliding using a central selector probe to hold a portion of the stack while the remainder is gravity fed towards a dropping end turntable.

A flexing configuration disclosed in U.S. Pat. Nos. 3,509,553 (Krijnen) and 3,618,055 (Van Acker), employs flexible (floppy) disks and isolates a selected disk by deflecting the adjacent disks with a bifurcated selecting member and guiding the selected disk between tine-like elements of the selecting member. This brings the selected disk into coupling communication with a head integral to one of the elements.

In another type of flexing configuration disclosed in the above cross-referenced commonly assigned patent applications, an interface between flexible disks is widened without isolating the disk having the surface to be accessed and a movable head is positioned in compliant floating relationship to the selected disk surface with cushioning effects supplied by the backing disks.

Both the Van Acker patent and the Penfold et al Patent Application show recognition of obvious potential advantages of thin flexible disks in respect to weight and volumetric recording density. Furthermore, the recording density in the individual disks being a function of closeness of head to disk spacing can be greater in Penfold et al due to potentially more intimate compliant contouring of the disk flow path to the head. There is further recognition indicated that circulation of air between the disks provides beneficial surface cleansing and motion stabilizing effects.

On the other hand "contact-less" sliding separation of disks as in the Gutterman and Seidel arrangements could lessen wear of recording surfaces and thereby potentially lengthen useful disk life. However floppy disks do not adapt conveniently to forcible piston-like maneuvering as contemplated by Gutterman, or to gravity feed as in Seidel.

SUMMARY OF THE INVENTION

The present invention contemplates reduced contact separation of slidable flexible disk multiples for storage access.

As used herein "partial expansion" and "partially expanded" refer to openings insufficient for transducing access produced between inaccessibly confined disks in a stack of disks. The term "expanded" characterizes openings sufficient for transducing access.

Starting with a shiftable end plate retaining the disks in an initial configuration of close confinement a selected interface is quickly expanded in a two-step operation of partial expansion and further expansion. Partial expansion is accomplished by forcing the selected facing disks apart without displacing the shiftable end plate, and serves only to establish a positive pressure difference between the selected interface and the other interfaces. Shortly after partial expansion the shiftable end plate is actuated to a less confining position in a very quick movement (e.g. a ¼ inch movement completed in less than 25 milliseconds). Due to suction effects accompanying such movement, and the pre-existence of the positive pressure difference mentioned above, the disks between the selected interface and the displaced plate are drawn cohesively toward the displaced plate and slide as a unit away from the partially expanded opening. The opening is thereby further expanded sufficiently for unobstructed entrance of the head.

Since the partial expansion is transitory, and since no contact with the disks is required to maintain the expanded configuration, contact between the disks and the access selecting apparatus is minimal. By use of a narrow air jet to force the disks apart for partial expansion contact with the disks can be totally eliminated.

With appropriate spacing and steady state air pressure between the disks, prior to partial expansion, the closely confined rotation can be bistabilized — as described in the above-referenced Patent Application by McGinnis et al entitled "Bistable Deflection Separation of Flexible Disks" — to permit triggered actuation of the partial expansion, and thereby further reduce the duration of interaction between the selecting apparatus and selected disks.

Upon expansion of the selected interface a head transported externally is inserted into the interface and positioned in compliant gliding relationship to a facing disk surface, for transducing operation as taught in the above-referenced U.S. Pat. No. 3,810,243 by McGinnis et al.

Upon completion of such transducing operation, and assuming that access to a different interface is required, the head is withdrawn for external transport, and the expanded interface is closed by returning the shiftable end plate to the closely confining position. In this state the assembly is prepared for a new cycle of partial expansion, end plate manipulation, transducing access and contraction relative to another interface space.

An object of the present invention is to provide for reduced abrasive contact between disk recording surfaces and access selection apparatus in an ultra large capacity random access storage file including multiple interfacing flexible disks.

Another object is to reduce distortional stress imposed on floppy type storage disks, arranged in a multiple disk file rotating at high speeds, during expansion of an interface between the disks for establishing space for insertion of a transportable transducing head.

Another object is to provide for establishing stable head clearance separations at selected interfaces of multi-disk storage files with decreased contact wear of sensitive portions of affected disk surfaces.

Another object is to selectively separate a stack of multiple storage disks, rotating and axially shiftable in a continuous volume of a fluid such as air, by concerted action of pressure differences established by forced partial separation of the disks and suction effects due to rapid sliding displacements of a co-rotating slidable end plate at one end of the stack.

A feature of the invention is the anti-friction mounting of the floppy disks and shiftable end plate for rotation and rapid sliding. Unexpectedly the paper thin disks can slide while rotating with minimal friction and wear at bearing surfaces.

Another feature is the use of a slidable co-rotating end plate for expanding the selected interface by cohesive sliding displacement of partially separated disks.

Another feature is the use of successive partial expansion and end plate displacement operations, the first to establish a pressure difference between the selected interface and the unselected interfaces and the second to produce cohesive shifting of the disks between the selected interface and the end plate.

Other features concern constructional details of members affecting the accuracy of shifting of the disks. These include sliding bearing constructions and alignment for the disks and shiftable end plate, end plate pressure release valve construction to maintain pressure difference equilibrium during expansional shifting, and disk spacing and pressurization constructions for facilitating partial expansion. The end plate valve construction includes an air passage and flexible membrane for admitting stabilizing air to the expanding interface during expansion movement, which eliminates an observed tendency of the disks on the static side of the interface to vary their positions during said movement.

The foregoing and other features, objects and advantages of the present invention will be more fully appreciated from the following description and claims.

DETAILED DESCRIPTION OF PREFERRED EMBODIMENTS

1. General Configuration

Figure 1:
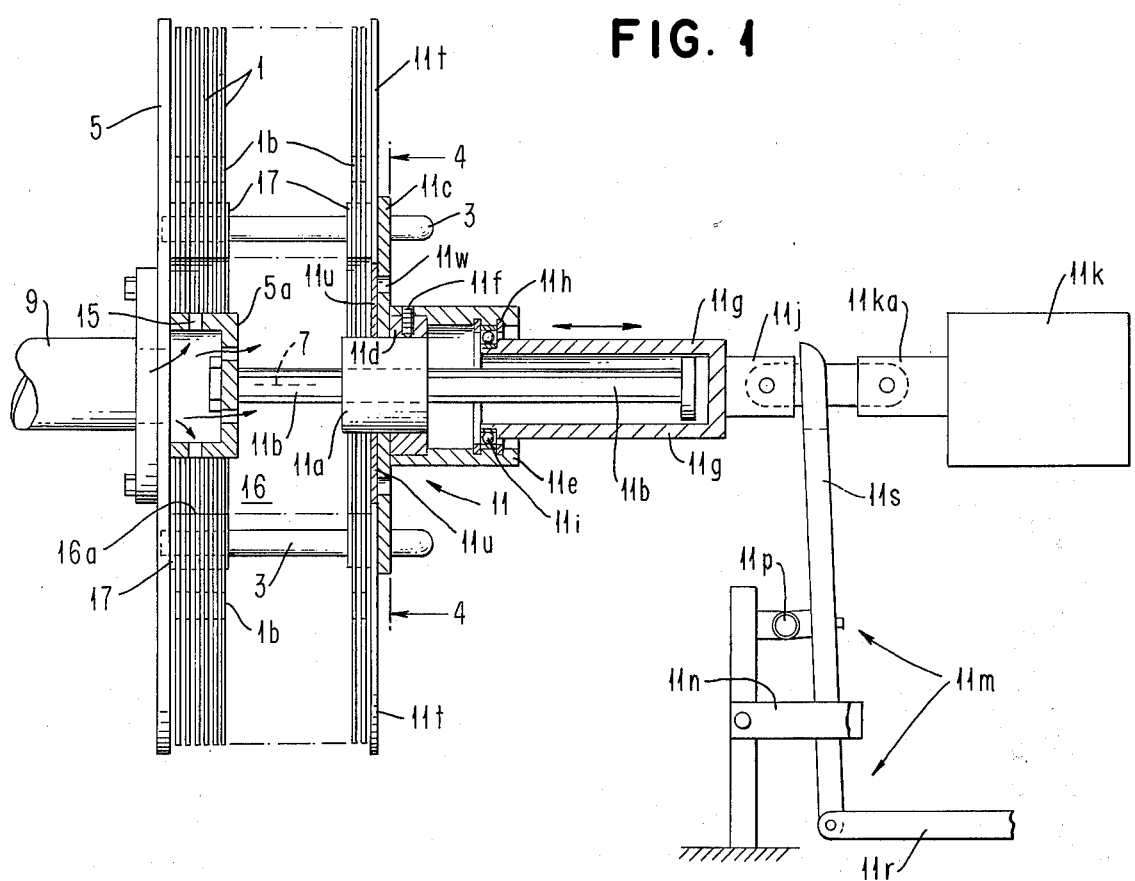
FIG. 1 an elevation partly schematic and partly in section of a preferred embodiment of the subject device.
Figure 2:
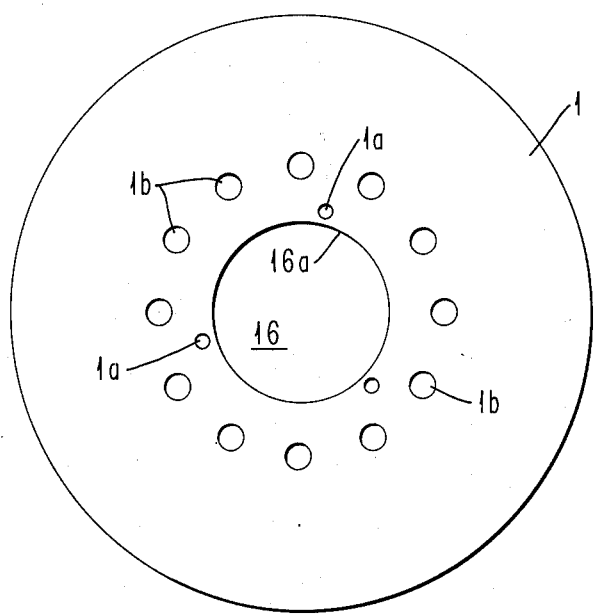
FIGS. 2 and 3 are plan views of respective storage and spacer disks in FIG. 1.

Floppy-type oxide-coated mylar memory disks 1 (FIGS. 1, 2) typically 1.5 mils thick, 12 inches in diameter, are mounted slidably on smoothly finished off-center pins 3 (typically three pins equally spaced) which fit snugly in respective openings 1a (FIG. 2) in the disks. The pins, preferably formed of hardened steel are securely attached to a rigid end plate 5 (FIG. 1) which has a fixed reference position perpendicular to axis of rotation 7.

Figure 4:
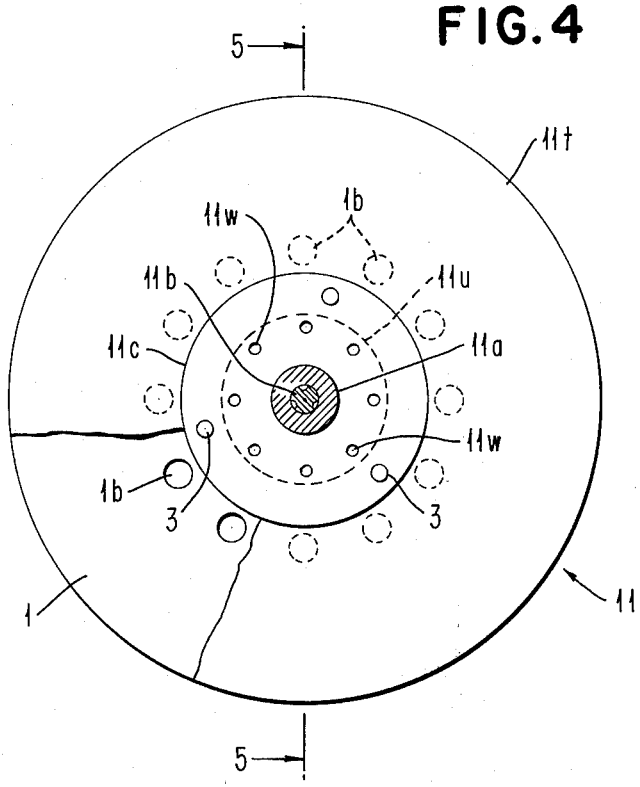
FIG. 4 is an end view of the shiftable end assembly in the apparatus of FIG. 1.
Figure 5:
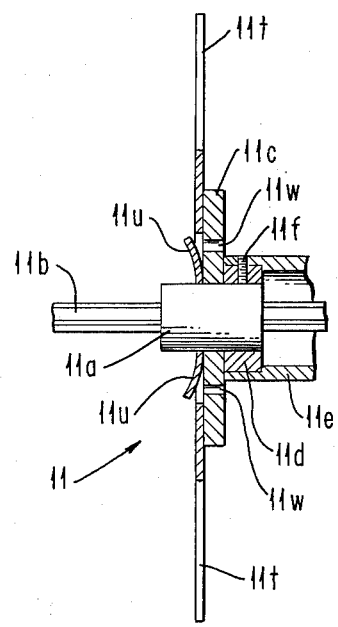
FIG. 5 is a sectional view through the assembly of FIG. 4.

Plate 5 is rotated about axis 7 by a not-shown motor coupled to hollow shaft 9. Pins 3 extend parallel to axis 7 through not-shown clearance openings in reciprocally slidable end assembly 11 (FIGS. 1, 4, 5) so that the disks are retained on the pins for all positions of assembly 11. Assembly 11 is rotationally coupled to shaft 9, via slidable ball spline 11a, non-slidable spline shaft 11b and hollow extension 5a of plate 5. Consequently, plate 5, pins 3 (hence also disks 1) and assembly 11 rotate about common axis 7 as a unit.

Other elements of end assembly 11 include (FIGS. 1, 4, 5): end plate 11c attached to spline 11a; inner coupling sub-assembly 11d, 11e, attached to spline 11a and held together circumferentially by a series of set screws 11f; non-rotating outer sub-assembly 11g held to inner sub-assembly 11e by spring clip 11h and separated by ball bearings 11i which permit friction-less rotation of the inner sub-assembly relative to the outer subassembly; extension piece 11j connected centrally to part 11g; solenoid 11k having armature 11ka coupled to piece 11j for pulling parts 11a, 11c, 11d, 11e and 11g outwardly (to the right) as a unit; and linkage 11m operated by a not-shown solenoid for pushing the just-mentioned parts inwardly (to the left) as a unit; linkage 11m is held in alignment by U-shaped member 11n and pivoted at 11p so that when lower link 11r is drawn to the right by a not-shown solenoid the symmetrically positioned bifurcated ends of upper link 11s pivot to the left pushing piece 11j and the splined assembly inward.

Flexible disk 11t, thicker than the record disks 1, and flexible membrane 11u are adhesively attached to plate 11c for rotation and translation with said plate. Membrane 11u (FIG. 5) is only partly adhered to plate 11c so that the peripheral portion thereof which covers ports 11w (FIG. 5) in plate 11c is bendable towards and away from ports 11w to admit stabilizing air to spaces between the disks.

Figure 7:
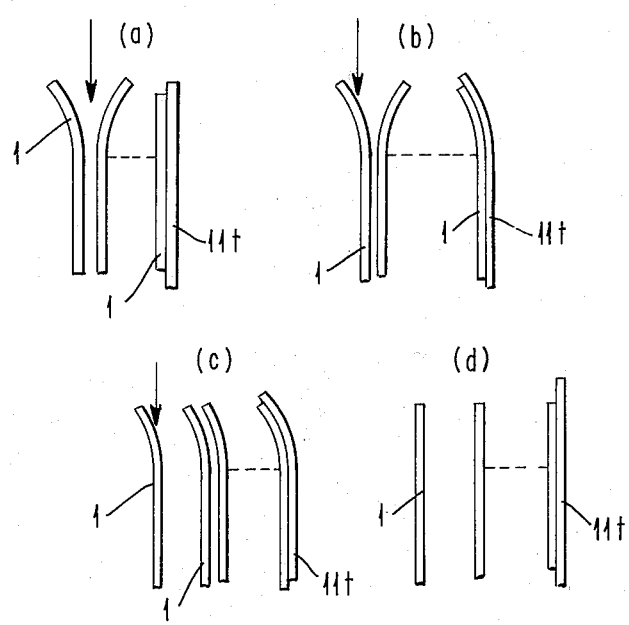
FIGS. 7 (a), (b), (c) and (d) are diagrammatic views of the disk motion accompanying the end assembly shift diagrammed in FIG. 6.

In operation, shaft 9 imparts rotation about axis 7 (typically at 1800 rpm) to plate 5, disks 1 and the rotatable portion (11a, 11b, 11c, 11t, 11u, 11e) of end assembly 11. Part 11g and associated shift actuating elements (11k, 11ka, 11m) do not rotate. Prior to access selection of an interface between disks 1 shiftable parts of end assembly 11 are positioned in the tight confining position (inward to the left in FIG. 1) by "pushing" actuation of linkage 11s and passive de-activation (or releasing actuation) of solenoid 11k. A not-shown selecting assembly moving parallel to the disks in an external position is aligned with the desired interface and forces the associated facing disks apart (either by contact or pressured air injection) to cause partial separation of the disks (FIG. 7a). It is contemplated that the force applied to partially separate the disks could also originate centrally, as in the Seidel patent referenced above; although this is not considered material to the presently claimed invention.

Figure 3:
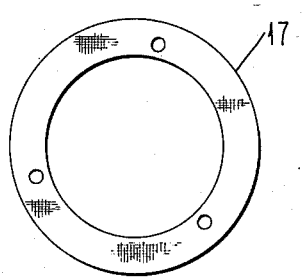

Air (preferably filtered) is transferred through hollow shaft 9 and openings 15 in part 5a (FIG. 1) to interior space 16 formed by interior edges 16a (FIGS. 1, 2) of disks 1. Air in space 16 is drawn through radially porous nylon mesh spacer disks 17 (FIGS. 1, 3) and expelled by centrifugal action. Spacer disks 17 are interposed between successive storage disks 1 and supported slidably on pins 3. In the initial position before partial expansion air flows from inner space 16 through the narrow interface spaces between disks (typically 3 mil spaces; disks 1.5 mil. thick) and is pumped out radially by centrifugal action creating a negative pressure relative to atmosphere in the interface spaces. Off-axis holes 1b in disks 1 (FIGS. 1, 2) allow air in the interface spaces between disks 1 to circulate axially through said disks.

As the selected disks 1 are partially separated, air (from outside the disks, from holes 1b and from interior space 16) fills the void formed by partial expansion creating a positive pressure difference between the partially expanded selected interface and the other interfaces. At this point the shiftable parts of end assembly 11 (i.e. all rotating parts except spline shaft 11b) are shifted to the loose confining position to the right (in FIG. 1) by actuation of solenoid 11k and passive de-activation or release of linkage 11m. Due to suction and cohesion effects, and to the just-mentioned pressure difference, the storage and spacer disks between the selected interface and end disk 11t slide cohesively as a unit as if adhered to disk 11t (refer to FIG. 7).

Figure 6:
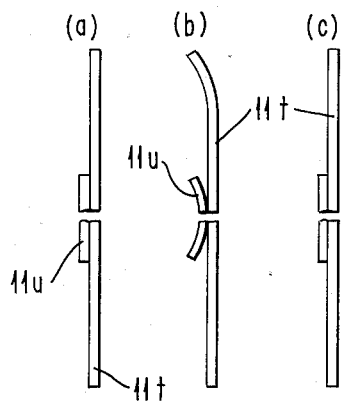
FIGS. 6 (a), (b), and (c) are diagrammatic views of the end assembly illustrating the operation of a pressure stabilizing valve membrane therein as said assembly shifts from a close confining position to a loose confining position relative to the disks.

The sudden expansion of space 16 during the movement of end plate 11c produces momentary sharp drop in pressure in space 16 which draws membrane (valve) 11u momentarily away from openings 11w (FIG. 6b), admitting additional external air to space 16. This additional supply of air serves to stabilize the pressure in the expanding interface sufficiently to counteract an observed tendency of the disks on the static side of the selected interface (left side) to be drawn toward the expansion void, and create uncertainty as to the positional location of the center of the expanded interface. As end plate 11c reaches its fully extended position (FIG. 7d) the disk rotation stabilizes with the center of the expanded interface in predetermined position relative to reference plate 5, and thereby accurately located for unobstructed entrance and operation of a not-shown externally transportable head (refer to the above cross-referenced patent 3,810,243 for details of head positioning).

In the expanded position off-axis holes 1b transfer air from the expanded interface to the other interfaces for cushioning effects relative to the head. When transducing operation(s) relative to the facing surface(s) is (are) completed the head is withdrawn, and the end assembly is restored to the close confining position preparatory to a new interface selection. Apparatus suitable for locating the interface for partial expansion, which forms no part of the present invention, is disclosed in co-pending U.S. Pat. application, Ser. No. 428,601, filed Dec. 26, 1973, by W. R. Chrysler, entitled "Disc Interface Location".

The off-axis holes 1b and spacer disks 17 are refinements which improve, but are not absolutely necessary for, operation of the invention. Similarly the flexibility of end member 11t provides for more uniform suction action on the disks but is not absolutely essential to operation. The member can be rigid. Likewise, oppositely directed actuators 11k and 11m are not necessary (e.g. a spring could be used in place of 11m but would increase the energy required to effect expansion).

The air supply to space 16 via shaft 9 can be "fine tuned" to provide bistable action in the partial expansion. In an empiricially adjusted pressure range of air coupled via shaft 9 to space 16, with the disks tightly confined so that air circulates only through spacer disks 17 into spaces between the storage disks, the disks rotate in bistable mode as described in above-referenced co-pending patent application by McGinnis et al, entitled "Bistable Deflection Separation of Flexible Disks". In this mode a small force deflects the disks to a partially expanded stable rotational configuration which is maintained in the absence of further force. While this is an advantage as it reduces the contact wear on the disks during partial expansion it is not essential to reduced contact operation. The "tuning" needed to establish such bistable expansion operation varies with disk and spacer geometry, rotational speed, and stack size (number of disks).

2. Operational Parameters

Apparatus operating in accordance with the principles outlined above comprises multiple (e.g. 500) magnetic oxide coated floppy-type mylar disks, typically twelve inches in outer diameter with thickness typically on the order $1.5 \times 10^{-3}$ inches. The assembly of disks and end plates is rotated at constant angular velocity in the range 1100 – 2400 rpm. Such disks have been repeatedly displaced between partial and full expansion positions at one interface (in excess of 1 million displacements) without noticeable signs of wear or distortion at the edges of pin mounting openings 1a.

Partial expansion is accomplished by contacting interfacing disk edges momentarily with a mechanical probe. Partial expansion has also been accomplished with a narrow jet of air.

A general observation in respect to the spaced configuration discussed above is that the time between partial and full expansion can be "tuned" to less than twenty milliseconds by suitable end assembly construction as shown.

Certain factors described above are considered vital to satisfactory performance. The pins 3 must be sufficiently smooth to provide low friction bearing support for the disks. The disk holes 1a receiving the pins must be uniform. The pins should be precisely parallel to the rotational axis throughout their length. The end assembly 11 must be accurately and symmetrically centered on said axis and plates 11c, 11t should be precisely perpendicular to said axis. Valve 11u may be a thin mylar membrane adhered to plate 11c. The openings in plate 11c receiving pins 3 must be wide enough to avoid contact with the pins. The end assembly suspension for shifting must be low or anti-friction and the end assembly activation should be applied as rapidly and as symmetrically as possible.

While the invention has been particularly shown and described with reference to preferred embodiments thereof, it will be understood by those skilled in the art that various changes in form and detail may be made therein without departing from the spirit and scope of the invention.

What is claimed is:
1. In a storage device:
   a pair of parallel end plates rotating about a common axis; one of said plates slidably supported for reciprocating low friction displacements to said axis;
   a stack of multiple storage disks supported between said plates for co-rotation about said axis and for low friction sliding displacements parallel to said axis; said disks and end plates surrounded by a fluid;
   means linked directly to said one plate for reciprocally actuating said one plate for causing close and loose confinement of said disks;
   means coordinated with said actuating means for forcing edges of said closely confined disks slightly apart at a selected interface in said stack to cause partial expansion of said selected interface, associated with causing a fluid pressure difference between the selected interface and the other interfaces; said partial expansion insufficient for unobstructed transducing access to said disks; and
   means operable following said partial expansion for operating said actuating means to shift said one plate quickly to said position of loose confinement, whereby, due to cohesion and suction effects accompanying said shaft and due to said established pressure difference, the disks between said partially expanded interface and said one plate are shifted slidably with said one plate as a cohesive unit, thereby further expanding said selected interface sufficient for unobstructed transducing access.

2. A device as in claim 1 in which said storage disks are flexible.

3. A device as in claim 2 in which said one plate is inflexible.

4. A device as in claim 2 in which said one plate is peripherally flexible and flexes inwardly towards said disks by inertia during said shift to said position of loose confinement.

5. A device as in claim 2 in which said other plate has attached thereto a plurality of smoothly finished pins extending parallel to said axis through holes in said disk, said pins slidably retaining said disks and coupling said disks rotatably to said other plate; said one plate having clearance openings into which said pins extend so that said disks are retained on said pins for all positions of said one plate.

6. A device as in claim 2 including means for coupling said one plate and said other plate to a common source of rotational drive.

7. A device as in claim 6 wherein said coupling means includes means rotatably linking said one plate to said other plate through a linkage including a low friction slide coupling for permitting low friction rapid actuation of said one plate between said close and loose confinement positions.

8. A device as in claim 2 wherein successive said disks are separated when closely confined by radially porous spacer disks mounted for co-rotation and sliding displacements together with associated said storage disks.

9. A device as in claim 2 wherein said disks have aligned off-axis venting holes permitting circulation of fluid through said disks.

10. A device as in claim 2 wherein said disks have central holes forming an inner space containing said fluid.

11. A device as in claim 10 wherein said one plate contains an opening normally blocked off by a valve element which is displaced, during the shifting of said one plate to said loose confinement position, to admit a stabilizing supply of external fluid into said inner space.

12. A device as in claim 11 wherein said valve element is a membrane covering said opening and partially adhered to said one plate, on the interior side of said plate communicating with said inner space, at an area removed from said opening.

13. A device as in claim 11 wherein said valve operates due to a momentary drop in fluid pressure in said inner space, as said inner space expands during said shift of said one plate to loose confinement position.

14. A device as in claim 2 wherein said fluid is air.

15. A device as in claim 11 wherein said fluid is air.

16. A device as in claim 1 wherein said actuating means includes first and second actuating elements; one for actively pulling the one plate to said loose confinement position while the other passively offers no resistance, and the other for actively pushing the one plate to the close confinement position while the one element passively offers no resistance.

17. A device as in claim 1 in which said forcing means physically contacts said edges.

18. A device as in claim 1 in which said forcing means consists of a jet of fluid directed at said edges.

19. A device as in claim 1 in which successive said disks are initially unspaced while in said close confinement position before operation of said forcing means.

20. A device as in claim 1 in which successive said disks are initally separated while in said close confinement position, before operation of said forcing means.

21. In a random access storage device:
   multiple flexible storage disks arranged in a stack between confining end plates, said disks and plates arranged for rotation about a common axis, one of said plates having a fixed axial position, said disks and the other said plate being mounted for low friction sliding displacement relative to said one plate during said rotation;
   means coupled to said other plate for positioning said other plate, while it and the disks are rotating, to a predetermined closely confining position relative to said disks;
   means subject to random selection operation for causing partial separation of said closely confined disks at a selected interface; and
   means for quickly shifting said other plate from said confining position to a predetermined less confining position at a rate sufficient to exert suction action upon said partially separated disks, sliding said disks as a unit and widening said selected interface thereby sufficiently for allowing unobstructed transducing access to a disk surface at said selected interface.

22. A device according to claim 21 in which said disks are slidably mounted upon plural pins attached to said one end plate and extending parallel to said axis through clearance openings in said other plate.

23. A device as in claim 22 in which said disks have aligned vacant holes containing a fluid subject to radial circulation between said disks during said shifting to less confining position.

24. A device as in claim 23 wherein successive said storage disks are separated by thin small-diameter radially porous spacer disks mounted slidably on said pins, said spacer disks permitting passage of said fluid between said disks.

25. A device as in claim 22 wherein said disks have aligned vacant holes at predetermined off-axis radial positions thereof for circulating said fluid axially through said disks.

26. A device as in claim 25 wherein successive said storage disks are separated by small diameter spacer disks establishing fluid circulation spaces between said successive storage disks for receiving said contained fluid by centrifugal action.

27. A device as in claim 23 in which said other plate has a port communicating with the said disk holes, said port having a normally closed valve operated by pressure drop caused by movements of said other plate to said less confining position to transfer external fluid through said duct into said disk holes.

28. A device as in claim 22 wherein said means for positioning comprises a pair of oppositely directed actuating assemblies reciprocally coupled to said other plate.

* * * * *